United States Patent
Shiota

(10) Patent No.: US 9,329,704 B2
(45) Date of Patent: May 3, 2016

(54) INFORMATION INPUT APPARATUS, INFORMATION INPUT SYSTEM, AND INFORMATION INPUT METHOD

(75) Inventor: Kazuomi Shiota, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 179 days.

(21) Appl. No.: 13/419,854

(22) Filed: Mar. 14, 2012

(65) Prior Publication Data

US 2012/0287089 A1 Nov. 15, 2012

(30) Foreign Application Priority Data

May 10, 2011 (JP) ................................ 2011-105605

(51) Int. Cl.
| | |
|---|---|
| G06F 3/033 | (2013.01) |
| G06F 3/0354 | (2013.01) |
| G06K 9/22 | (2006.01) |
| G06K 9/20 | (2006.01) |
| G06F 3/0488 | (2013.01) |
| G06K 9/00 | (2006.01) |

(52) U.S. Cl.
CPC ........ *G06F 3/03545* (2013.01); *G06K 9/00429* (2013.01); *G06K 9/2054* (2013.01); *G06K 9/222* (2013.01); *G06F 3/04883* (2013.01); *G06K 9/00416* (2013.01); *G06K 9/00798* (2013.01); *G06K 2209/01* (2013.01)

(58) Field of Classification Search
USPC .................................................. 345/179–184
See application file for complete search history.

(56) References Cited

U.S. PATENT DOCUMENTS

| | | | |
|---|---|---|---|
| 7,002,559 B2 * | 2/2006 | Ericson .......................... | 345/179 |
| 7,526,403 B2 * | 4/2009 | Hogan et al. .................. | 702/152 |
| 7,710,408 B2 * | 5/2010 | Ericson .......................... | 345/179 |
| 2006/0125805 A1 * | 6/2006 | Marggraff ...................... | 345/179 |
| 2007/0064036 A1 | 3/2007 | Hasuike | |
| 2008/0018591 A1 * | 1/2008 | Pittel et al. ..................... | 345/156 |
| 2013/0328933 A1 * | 12/2013 | Abramson ........... | G01C 21/367 345/648 |

FOREIGN PATENT DOCUMENTS

| | | |
|---|---|---|
| JP | 2004-46424 A | 2/2004 |
| WO | 2008/141250 A2 | 11/2008 |
| WO | 2009/143533 A2 | 11/2009 |

OTHER PUBLICATIONS

Japan Publication No. 2004-46424 on Feb. 12, 2004 by Ueno, Koyo.*
Office Action issued Sep. 9, 2014, in Japanese Application No. 2011-105605.
Extended European Search Report received in corresponding European Application No. 12159134.1 dated Oct. 22, 2015.

* cited by examiner

*Primary Examiner* — Linh N Hoffner
(74) *Attorney, Agent, or Firm* — Mattingly & Malur, PC

(57) ABSTRACT

The present invention achieves an information input apparatus for inputting position location information by an input using a pen-type input device configured to acquire handwriting data expressed as a trace of coordinate positions. The information input apparatus includes: an input format presenting unit for presenting an input format for interpreting the handwriting data, the input format having a location input field used to input a figure or a symbol in such a manner that a location in a drawing is identifiable; a location information acquisition unit for recognizing the figure or the symbol inputted in the location input field and for acquiring information on the location of the figure or the symbol inputted in the location input field, on the basis of the handwriting data of the figure or symbol inputted in the location input field.

7 Claims, 11 Drawing Sheets

System configuration

Input format

Input format

Fig. 3

Input format data

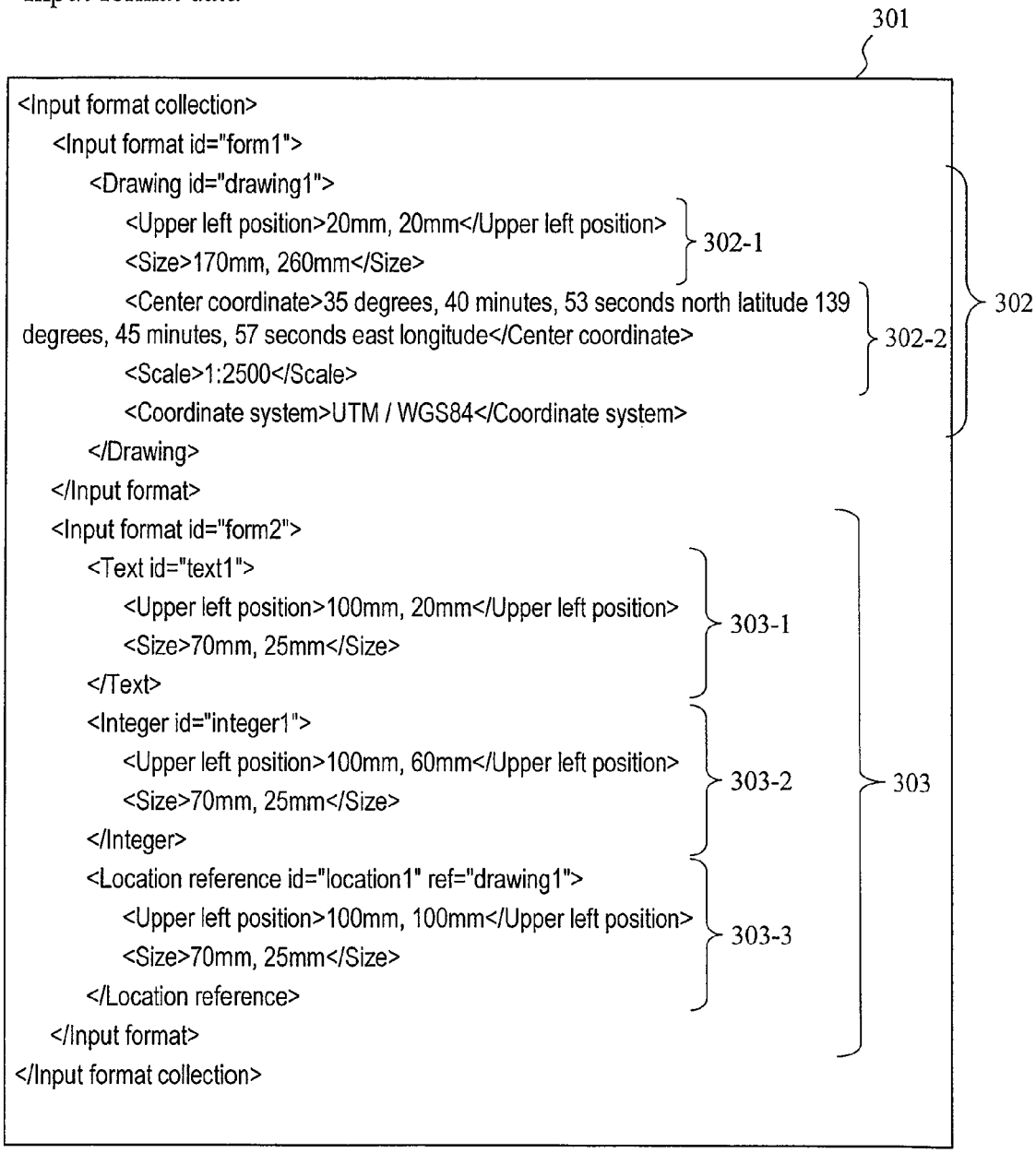

```
<Input format collection>
    <Input format id="form1">
        <Drawing id="drawing1">
            <Upper left position>20mm, 20mm</Upper left position>
            <Size>170mm, 260mm</Size>
            <Center coordinate>35 degrees, 40 minutes, 53 seconds north latitude 139 degrees, 45 minutes, 57 seconds east longitude</Center coordinate>
            <Scale>1:2500</Scale>
            <Coordinate system>UTM / WGS84</Coordinate system>
        </Drawing>
    </Input format>
    <Input format id="form2">
        <Text id="text1">
            <Upper left position>100mm, 20mm</Upper left position>
            <Size>70mm, 25mm</Size>
        </Text>
        <Integer id="integer1">
            <Upper left position>100mm, 60mm</Upper left position>
            <Size>70mm, 25mm</Size>
        </Integer>
        <Location reference id="location1" ref="drawing1">
            <Upper left position>100mm, 100mm</Upper left position>
            <Size>70mm, 25mm</Size>
        </Location reference>
    </Input format>
</Input format collection>
```

Symbol pattern

Symbol pattern

Symbol pattern

Symbol pattern

Symbol pattern

Symbol pattern

Symbol pattern

Symbol pattern

Fig. 5

Symbol pattern data

```
<Symbol pattern collection>
    <Symbol pattern id="symbol401">
        <Figure id="point1">                    ⎫
            <Figure type>Dot</Figure type>      ⎬ 501-1
        </Figure>                               ⎭
        <Text id="text1">                       ⎫
            <Text pattern>[A-Z][0-9]+</Text pattern>  ⎬ 501-2
        </Text>                                 ⎭
        <Condition>                             ⎫
            <Target>point1</Target>             ⎪
            <Target>text1</Target>              ⎬ 501-3
            <Relationship>Adjacently arranged</Relationship>  ⎪
        </Condition>                            ⎭
        <Pen attribute>                         ⎫
            <Attribute name>Color of pen</Attribute name>  ⎬ 501-4
            <Attribute value>Black</Attribute value>  ⎪
        </Pen attribute>                        ⎭
        <Location>                              ⎫
            <Target>point1</Target>             ⎬ 501-5
        </Location>                             ⎭
    </Symbol pattern>
</Symbol pattern collection>
```

Input result data

Processing procedure of input field allocation part

Processing procedure of symbol comparison part

Processing procedure of input result data generation part

INFORMATION INPUT APPARATUS, INFORMATION INPUT SYSTEM, AND INFORMATION INPUT METHOD

BACKGROUND OF THE INVENTION

1. Field of the Invention

The present invention relates to an information input technique and particularly relates to an information input technique using a computer capable of inputting a location of an object to be examined on a map or a drawing by using a pen-type input device or the like which is capable of digitally recording handwriting.

2. Description of the Related Art

Digital input systems include a type which records handwriting and the like in a stylus pen or the like and a type which detects handwriting by using a touch panel.

An operation of a pen-type input device such as a digital pen and a stylus is similar to writing on a paper sheet with a writing material such as a pen in feeling, and the development thereof has thereby become popular in the recent years. The use of such an input device has the following characteristics. The user can easily learn how to use the input device. The input device can be easily carried around and thus can be used anywhere anytime. Moreover, the input device can easily record an attribute to be associated with handwriting, the attribute related to information such as when and who wrote the handwriting. This allows the handwriting to be used as a trail.

In a technical point of view, the input device also has such a characteristic that a character recognition ratio can be improved compared to the case of recognizing handwritten characters by using OCR (Optical Character Recognition), the handwritten characters digitized with a scanner. This is because the input device can detect the order of strokes and pen pressure.

The pen-type input device has been introduced into business usage mainly to reduce a load of work of inputting data into a computer system. In the input work in such usage, data can be inputted mainly by inputting a number, inputting a text such as a name, and selecting a choice from multiple choices by drawing a circular mark or a check mark with a pen. The handwriting of the number, text, and mark written by the user is digitally recorded as a coordinate sequence of movement positions of a pen point, is loaded into a computer system, and is converted into numeric values and characters by use of recognition software.

Patent Document 1 and Patent Document 2 listed below and the like can be given as publicly-known technical documents relating to the present invention. These documents give descriptions of a type which observes a character pattern with a pen and records the position thereof (coordinate value) in the pen in a time series or the like, and of a type which reads position coordinates from an origin of a recording sheet and transmits the position coordinates to a PC or the like to store the position coordinates therein.

Patent Document 1: International Patent Application Publication No. WO 2008/141250A2
Patent Document 2: International Patent Application Publication No. WO 2009/143533A2

SUMMARY OF THE INVENTION

The method in which the data of handwriting written into a sheet form is recognized and converted into numeric values and characters and the numeric values and characters are registered in the information system is not so different from a conventional style where a work is performed with a paper sheet and a pen without using a digital technology (non-digital input), in terms of a sense of the operator. Thus, the method is highly developed in terms of the learnability of usage from a view point of an operator.

However, in respect to the input of location information, the way how the operator inputs the location information and information associated with the location with the pen-type input device in the work using a digital pen as described above differs greatly from the way in the conventional non-digital input technique, i.e. the work of writing on a paper sheet with a ball-point pen.

For example, in the conventional non-digital input, it is general to point a certain location on, for example, a map and write related information near the pointed location.

Meanwhile, in the digital input, it is general to input location information into a general format by using numeric values of (x, y) coordinate or the like and an input of the related information is performed in a similar way. Accordingly, when the operation for the input of location information is compared with the operation in the conventional non-digital technique which is performed when a form sheet is created, the operation methods are different. Thus, from a view point of the operator, it is not easy to learn the operation method of inputting the location information and the like, and also the operator dose not have the sense that he or she is performing a similar operation.

Moreover, the input of the location information is achieved in Patent Document 1 and Patent Document 2 described above in the following way. The operator traces a map legend, a stencil, an icon resembling a button of a screen, and the like printed at predetermined positions with the digital pen or the like to give an instruction of an operation to be performed on a paper sheet, and then draws a dot on the map.

Meanwhile, the location on the paper sheet is uniquely specified in the following methods. For example, a pattern associated with the location is printed on the paper sheet. When a symbol or the like is to be drawn on the paper sheet with the input pen, the pattern of the symbol is acquired and the symbol or the like is associated with the location information. Moreover, there is a method in which a coordinate position is acquired based on the difference between the light and sound which travel between a pen and a device.

In these methods also, the way of using a pen is different from the conventional work performed with a paper sheet and a ball-point pen. Thus, it is difficult for the operator to learn the operation method in comparison with the actual method.

An object of the present invention is to provide an information input technique allowing the operator to easily learn a usage method, which is a characteristic of a pen-type input device, for an input operation of location information and an input operation of information associated with a location.

One aspect of the present invention provides an information input apparatus for inputting location information by an input using a pen-type input device configured to acquire handwriting data expressed as a trace of coordinate positions, the information input apparatus including: an input format presenting unit for presenting an input format for interpreting the handwriting data, the input format having a location input field used to input a figure or a symbol in such a manner that a location in a drawing is identifiable; a location information acquisition unit for recognizing the figure or the symbol inputted in the location input field and for acquiring information on the location of the figure or the symbol inputted in the location input field, on the basis of the handwriting data of the figure or symbol inputted in the location input field.

For example, a map is presented as the input format and a location on the map is pointed by using a symbol or figure, for example, by using a dot as shown in FIGS. 4A to 4H. Thus, it is recognized from the handwriting data that the figure or the symbol is a point (dot). Furthermore, from the handwriting data being a trajectory of position information, the location of the point can be acquired by specifying the location corresponding to the handwriting data recognized as the point. When a geometric-figure recognition part recognizes the inputted handwriting data as a dot, the dot inputted in the presented format is specified from coordinate data divided together with the handwriting data, and the location (data) is acquired from the coordinate data of the dot.

Incidentally, a location on a map or the like can be designated by causing the coordinate system of the format and the coordinate system of the pen to match each other.

The location information is relative one. However, if an absolute coordinate is defined in the input format, the inputted location can be acquired as an absolute value on the basis of the absolute coordinate.

It is preferable that the location information acquisition unit links the handwriting data located within the location input field with the location input field by using location information of the location input field and thereby obtains the location of the figure or the symbol. Moreover, it is preferable that the input format presenting unit presents an input format having a location association information input field used to input location association information which is desired to be associated with the location of the figure or the symbol used to refer to the location of the figure or the symbol, and the information input apparatus further includes an input result data generation unit for generating input result data including the location of the figure or the symbol and the location association information.

The information desired to be associated with the location can be associated with the location by providing the position association information input field.

Moreover, the present invention provides an information input apparatus for inputting location information by an input using a pen-type input device configured to acquire handwriting data expressed as a trace of coordinate positions, the information input apparatus including: a unit for presenting an input format for interpreting the handwriting data, the input format having a location input field and a location association information input field, the location input field used to input a figure or a symbol including at least a point in a drawing to designate a location of the figure or the symbol and to input the location of the figure or the symbol in a manner associated with a first symbol for specifying the location, the location association information input field used to input location association information which is desired to be associated with the location of the figure or the symbol and includes a second symbol used to refer to the location of the figure or the symbol; a unit for recognizing the figure or the symbol from the handwriting data, specifying the location of the figure or the symbol inputted in the location input field in a manner associated with the first symbol, and thereby obtaining a coordinate of the figure or the symbol; a comparing unit for comparing the first symbol and the second symbol; and an input result data generation unit for, when it is judged that the first symbol and the second symbol are the same on the basis of a comparison result of the comparing unit, generating input result data including a set of the location of the figure or the symbol associated with the first symbol and the location association information associated with the second symbol as input result data.

It is preferable that the unit for acquiring the location of the figure or the symbol links the handwriting data located within the location input field with the input field by using location information of the location input field and thereby obtains the location of the figure or the symbol.

The present invention provides an information input system including: any one of the information input apparatuses described above; the pen-type input device; a handwriting data acquisition unit for acquiring the handwriting data from the pen-type input device; and an output unit configured to output the input result data to an information system.

Another aspect of the present invention provides an information input method with which location information and information to be associated with a location are acquired from a pen-type input device configured to acquire handwriting data expressed as a trace of coordinate positions, the information input method including the steps of: presenting an input format for interpreting the handwriting data, the input format having a location input field and a location association information input field, the location input field used to input a figure or a symbol in such a manner that a location in a drawing is identifiable, the location association information input field used to input location association information which is desired to be associated with the location of the figure or the symbol used to refer to the location of the figure or the symbol; acquiring information on the location of the figure or the symbol inputted in the location input field by recognizing the figure or the symbol from the handwriting data and by specifying the location of the figure or the symbol; and generating input result data including the location of the figure or the symbol and the location association information.

The present invention may provide a program for causing a computer to execute the information input method described above and a recording medium readable by a computer which stores the program.

A system easy to use for an operator can be achieved by the information input technique for inputting location information and information to be associated with the location of the present invention.

BRIEF DESCRIPTION OF THE DRAWINGS

FIG. 3 is a view showing a data structure example of input format data in the information input system of the embodiment.

FIG. 5 is a view showing an example of a structure of the symbol pattern data in the information input system of the embodiment.

DESCRIPTION OF THE PREFERRED EMBODIMENTS

An embodiment of an information input system for inputting location information and information to be associated with a location, to which the present invention is applied, is described with reference to the drawings.

Figure 1:
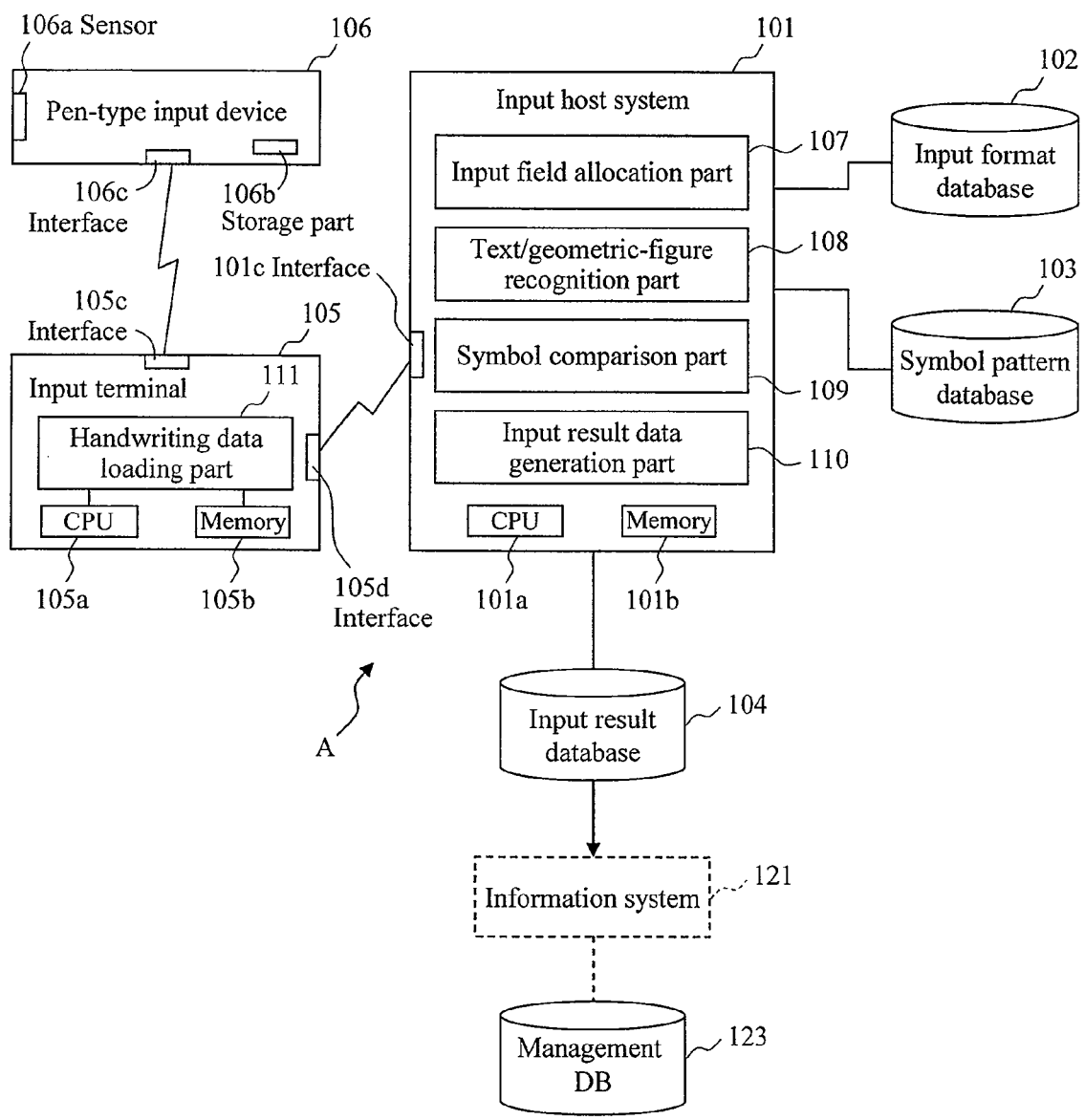
FIG. 1 is a block diagram showing a configuration example of an information input system of an embodiment of the present invention.

FIG. 1 is a functional block diagram showing a configuration example of an information input system of the embodiment of the present invention. An information input system A for inputting location information and information to be associated with a location includes an input host system 101, an input result database 104, an input terminal (PC) 105, and a pen-type input device 106. The input host system 101 includes (or is connected to, via a network) an input format database 102 storing input format data and a symbol pattern database 103 storing symbol patterns. The input result database 104 is provided in the input host system 101 or connected thereto via a network and stores input result data. The input terminal 105 is connected to the input host system 101 via a network. The pen-type input device 106 is connected to the input terminal 105 via a network.

The input host system 101 includes a general CPU 101a, a general memory 101b, and an interface part 101c. For example, the input host system 101 is configured to cause the CPU 101a to execute processing on the basis of the programs stored in the memory 101b and thereby function as an input field allocation part 107, a text/geometric-figure recognition part 108, a symbol comparison part 109, and an input result data generation part 110. Descriptions of the functional parts are given blow.

The input field allocation part 107 divides handwriting data expressed as a trace of position coordinates into pieces of handwriting data for respective input fields by using data of input fields designated in the input format database 102, the trace of position coordinates loaded from the pen-type input device 106 via the input terminal 105 as will be described later (see FIG. 7 and the like). The handwriting data is expressed as a trace of positions on a two-dimensional plane, for example, $\{(x1, y1), (x2, y2), (x3, y3), \ldots, (xn, yn)\}$ (n is a positive integer). The handwriting data may include an attribute (pen attribute or the like) shown in FIGS. 4A to 4H which will be described later. For example, if a red pen (can be identified from pen ID) is used, the handwriting data includes such an attribute that characters are written in red. The handwriting data preferably includes an input time at a coordinate of each position (at least for some of points of the handwriting data). The handwriting data may include a writing pressure and a writing speed as additional information for recognizing handwriting data.

The text/geometric-figure recognition part 108 provides a function of obtaining texts and geometric figures by analyzing the handwriting data of each of the input fields. This function is provided as software attached to the pen-type device or as software sold separately and is implemented by programmatic coordination using a development kit of the software. Although a detailed description of this function is omitted in the specification since the function is a general function, this function is one which recognizes which one of a text, a symbol, and a figure the inputted handwriting data is and which recognizes a type of the text and the figure, on the basis of the inputted position coordinates and the times associated with the position coordinates. The function is performed, for example by performing processing of limiting a recognition target region, text extraction processing, text recognition (after extracting the text, inputting an image of each character in the text into a recognition engine and identifying a corresponding character code), and the like.

For example, in the case of recognizing a text, the text/geometric-figure recognition part 108 receives the handwriting data as an input and returns a list of character code data. In the case of recognizing a geometric figure, the text/geometric-figure recognition part 108 receives the handwriting data as an input and returns the type of the geometric figure and a coordinate data string. For example, when a piece of handwriting is recognized as a point, the text/geometric-figure recognition part 108 returns a code indicating that the piece of handwriting is a point and a coordinate value of the point. When a piece of handwriting is recognized as a triangle, the text/geometric-figure recognition part 108 returns a code indicating that the piece of handwriting is a triangle and coordinate values of three points.

In order for the information input system of the embodiment to function, the text/geometric-figure recognition part 108 at least needs to detect a point from the handwriting data. The detection of point can be achieved in an extremely simple judgment since the handwriting data includes a sequence of coordinate values $\{(x1, y1), (x2, y2), (x3, y3), \ldots, (xn, yn)\}$. When only data of a certain position (and its vicinity) is inputted as the piece of handwriting, the data can be recognized as a point. In addition, when the data includes data of time and the same position is specified for a certain time, it is more likely that a point has been inputted. This improves recognition accuracy. For the recognition process to be more practical, it is preferable that recognition of texts and simple symbols are also possible. For example, this is the case where the handwriting data is $\{(x1, y1), (x1, y1), (x1, y1), \ldots, (x1, y1)\}$ or the case where values close to x1, y1 are inputted continuously.

The symbol comparison part 109 provides a function of extracting a symbol from the recognized texts and geometric-figures and acquiring the location information of the symbol and information to be associated with the symbol, as will be described later (see FIG. 8).

The input result data generation part 110 provides a function of outputting the location information of the symbol and the information associated with the symbol which are acquired by the symbol comparison part 109, to the input result database 104 as input result data, as will be described later. The input result database 104 outputs an input result to, for example, a general information system 121 such as a PC for office, and the input result managed by being stored, for example, in a management database 123 of the PC for office.

The input terminal (PC) 105 includes a CPU 105a, a memory 105b, and an interface part 105d used to perform communication with the input host system 101 via an interface part 101c thereof. The input terminal 105 causes the CPU 105a to execute a program stored in the memory 105b and thereby function as a handwriting data loading part 111. The handwriting data loading part 111 provides a function of loading the handwriting data from the pen-type input device 106 via an interface part 105c and transmitting the handwriting data to the input host system 101. The pen-type input device 106 is a device capable of digitally recording the handwriting written with a pen in a storage part 106b, and examples thereof include a digital pen, a stylus, and the like. The digital pen has a pen point with ink similar to a ball-point pen, and is such an input device that handwriting written therewith on a paper sheet is recorded as digital data. The stylus is such an input device that the handwriting written therewith on a flat panel display, a tablet, or an electronic paper is digitally recorded. For example, a sensor such as a sensor 106a sensing that the pen point is in contact with and pressed against a paper sheet or the like is attached to the pen-type input device 106. The handwriting data is outputted to the input terminal 105 via an interface part 106c by way of a wired communication, a wireless communication, or the like. The input terminal 105 functions as a handwriting data acquisition unit used for the acquisition of the handwriting data by the input host system 101.

Figure 2A:
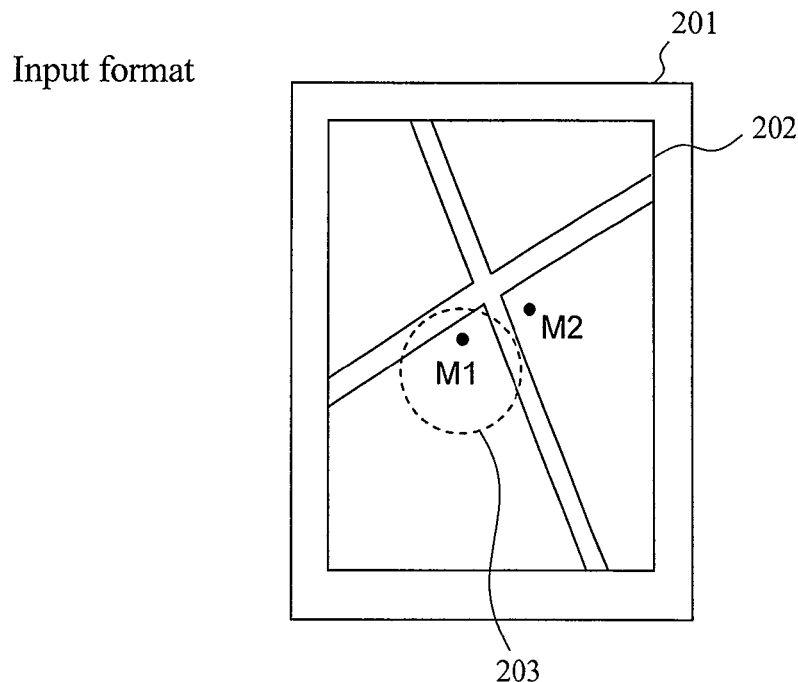
FIGS. 2A and 2B are views each showing an example of an input format in the information input system of the embodiment.
Figure 2B:
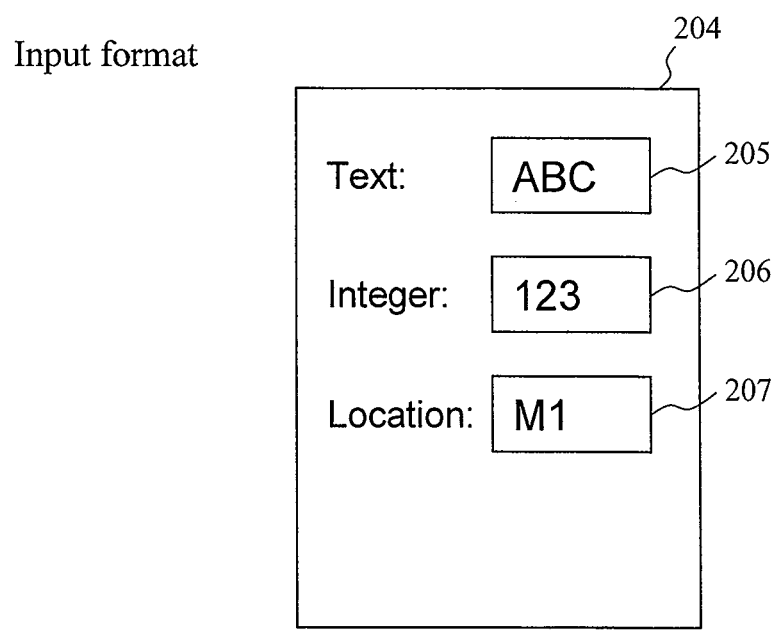

The input format data stored in the input format database 102 is data of a format used by the user to input information. The input format data is used to designate which type of information an item inputted by the pen-type input device 106 is and which spatial position the item is to be written into. When the input device 106 is a general digital pen, formats as illustrated in FIGS. 2A and 2B are printed on paper sheets or the like and provided to the user, as will be described later. The user performs an input with the input device (pen) in accordance with the formats of the paper sheets. Meanwhile, when the input device 106 is the stylus pen (a form in which items are written into a template), the formats as shown in FIGS. 2A and 2B are displayed on a display unit of a PC (for example, tablet PC) forming a set with the pen-type input device 106, and points, symbols, and the like are written (inputted) into the formats.

A description is given below of an example of writing point, symbols, and the like into a printed paper material with the pen-type input device 106 as shown in FIGS. 2A and 2B. However, a similar process can be performed in the case of the latter example. The following method can be used in a type in which an input is performed on an electronic paper by using a stylus, or may be executed by using a smart phone, a PDA, and an electronic paper.

Each of FIGS. 2A and 2B is a view showing an example of an input format which is outputted from the input format database 102, for example, by being printed out, and is a view of an example of an input format which is presented when a certain location on a map is to be pointed. An input with the pen-type input device 106 is performed on the input formats shown in FIGS. 2A and 2B, and the handwriting data obtained in the input is loaded into a host device via the pen-type input device 106 and the input terminal 105.

FIG. 2A is a view showing an example of an input format used when the input format to be presented is a map and shows an input format 201 for writing location information into the map. At the moment when the input format 201 is presented, two points and symbols M1 and M2 are not drawn yet. FIG. 2B is a view showing the example of an input format 204 for writing information to be associated with a location. At the moment when the input format 204 is presented, there are only information of "text" "integer" and "location" and frames 205, 206, and 207 in the input format 204, and "ABC" being a specific text, "123" being specific integers, and "M1" being specific information to be attached to the location are not written yet.

As shown in FIG. 2A, the input format 201 has an input field 202 for inputting (pointing) a location in, for example, a map, and a point (dot) and a symbol (M1 in this example) associated therewith can be inputted into the map as shown in a broken line 203. Here, a map is given as an example of the input format. This is because the case of inputting a location on the map is taken as an example. For example, in the case of inputting a location to indicate a repair portion of a car, a view of the car or the like is presented to indicate a point of the repair portion of the car. Furthermore, a format for indicating a location of any object can be presented.

In FIG. 2A, the dot (figure) and a first symbol M1 are inputted close to each other (to be associated with each other). Since there are two dots in FIG. 2A, information is attached to each of the dots to identify locations M1 and M2. Meanwhile, there is no need to attach the symbol for identifying the point in the case where a circular dot and a square dot are used or in the case where a black dot and a white dot are used and the points can be thereby identified from shape or the like. Furthermore, there is no need to attach the symbol also in cases such as the case where only a single piece of the location information is inputted in a drawing (map or the like) or a form sheet. The handwriting data obtained by writing dots, symbols, and the like with the pen-type input device 106 in the input format is loaded into the handwriting data loading part 111, and is then loaded into the input host system 101.

FIG. 2B is the view showing the input format 204 which is an example of a format for inputting the information (texts, integers, and the like) desired to be associated with the location, the symbol used to distinguish the location, and the like. In FIG. 2B, an example is given in which three types of input fields are designated. The input format 204 is such an input format that includes: the input field 205 designated as a field used to input a text; the input field 206 designated as a field used to input numeric values; and the input field 207 used to write information for specifying a location to which the information (text, integers, and the like) desired to be associated with the location information (dot in FIG. 2A) in the input fields 205 and 206 is to be associated with. In the example shown in FIG. 2B, "text", "integer", and "location", which are titles for general purpose, are attached respectively to the input fields as titles thereof. However, when the input format is actually used in business, titles matching the business can be attached. The handwriting data obtained when dots, symbols, and the like are written into this input format with the pen-type input device 106 is loaded into the handwriting data loading part 111.

Incidentally, in FIG. 2B, the input fields are shown by rectangles, so that the positions of the input fields are easily recognized. However, the input fields may be actually shown in a different form, and any form may be used as long as an operator can recognize the fields. For example, the input fields may be presented to the operator by painting out fields to be filled with a pale color.

The example of writing a text and the like into the map of FIGS. 2A and 2B can be used, for example, as an input system in an insurance company or the like, the input system used to store and output a location and a type of an accident of a certain car. Furthermore, the example can be used for various instances such as for giving instructions on a repair portion of a car.

FIG. 3 is a view showing an example in which the two input formats shown in FIGS. 2A and 2B are expressed as data of XML (Extensible Markup Language) format, the two input formats being those before the pen input with the pen-type input device (before writing the symbol, the text or the like with the pen-type input device). An arbitrary number of input formats can be presented by using an input format collection tag including input formats as shown in FIG. 3. Input format data 301 shown in FIG. 3 is data to be used as a reference necessary to interpret the handwriting data. A drawing tag 302 of FIG. 3 is data indicating the state of the blank map of FIG. 2A. A portion 303 including a text tag 303-1, an integer tag 303-2, and a location reference tag 303-3 is data indicating the input fields (in a state where nothing is written into the input fields) of FIG. 2B.

The input format tags correspond, for example, to the input format 201 of FIG. 2A and the input format 204 of FIG. 2B.

Tags indicating an arbitrary number of input fields can be designated in the input format tags. In the example shown in FIG. 3, there are the drawing tag 302, the text tag 303-1, the integer tag 303-2, and the location reference tag 303-3. The drawing tag 302 indicates the format of the field used to input the location with the pen-type input device 106. Specifically, the drawing tag 302 indicates a form of the input field 202 of FIG. 2A. The text tag 303-1 is a field used to input the text with the pen-type input device 106 and corresponds to the input field 205 of FIG. 2B. The integer tag 303-2 is a field used to input integers with the pen-type input device 106, and corresponds to the input field 206 of FIG. 2B. The location reference tag 303-3 is a field used to input the symbol written into the location input field designated in the drawing tag or the name of the symbol with the pen-type input device 106, and corresponds to the input field 207 of FIG. 2B. In the tag representing each of the input fields, information on a position of the input field in the format presented to the operator is described.

As describe above, the handwriting data and the like are not described in the format data shown in FIG. 3. In the comparison between FIG. 3 and FIGS. 2A and 2B which is described below, the input of dots in the input field 202, the writing of text, integers, location and the like into the fields 205 to 207 in the input formats are not performed.

In the example shown in FIG. 3, as shown in 302-2, an upper left coordinate of the field is designated in an upper left position tag and the size of the field is designated in a size tag (the field is one which could be arbitrarily provided). The drawing tag 302 is further added with, in the case of a drawing, information on an area in a model of the drawing which is represented by the drawing tag 302, or added with, in the case of a map, information on an area in the map which is represented by the drawing tag 302. In this example, the drawing tag 302 represents the location on the map. In the drawing tag 302, it is indicated that: the center of a frame of the map represented by the drawing tag 302 is at 35 degrees, 40 minutes, 53 seconds North latitude and 139 degrees, 45 minutes, 57 seconds East longitude in the map, which is designated in a center coordinate tag; the scale of the map is ½₂₅₀₀, which is designated in a scale tag; and the coordinate system being a reference of the latitude, the longitude, and the scale is designated in a coordinate system tag such that the reference of the latitude and the longitude is WGS 84 geodetic system being a world standard and a projection method of the map is UTM (Universal Transverse Mercator). These pieces of information (upper left coordinate of the field in the upper left position tag, the size of the field in the size tag, and the center coordinate) are used to specify a location such as a point drawn in the blank map. In other words, the location of the point can be obtained as an absolute location from these pieces of information.

Each of the pieces of information represented by a corresponding one of the XML tags such as the drawing tag 302, the text tag 303-1, the integer tag 303-2, and the location reference tag 303-3 described above can have an identifier unique in the XML document 301. The identifier of each tag is represented by an id attribute of the tag in this example. For example, the identifier of the drawing tag 302 in FIG. 3 is designated to be drawing1 in a tag attribute of id="drawing1". The location reference tag 303-3 can designate a drawing which includes the location information and the format of the drawing. In the example of FIG. 3, a ref attribute makes a designation of ref="drawing 1", which represents that the location information is to be acquired from a symbol drawn in a drawing having the identifier of "drawing1". Moreover, the upper left position and the size are described in each of the text tag 303-1, the integer tag 303-2, and the location reference tag 303-3. This information indicates that each of the text, integers, and the reference location is to be described within a specified range (within a region defined by the left upper position and the size). Furthermore, it is designated in the location reference tag 303-3 that the location information is to be acquired from the figure (dot) associated with the symbol drawn in the drawing having the identifier of "drawing1".

The symbol patterns stored in the symbol pattern database 103 is data used to designate which symbol is to be written in a field used to input a location in the input format defined by the input format data stored in the input format database 102.

Figure 4A:
FIGS. 4A to 4H are views showing various examples of symbols expressed in symbol pattern data in the information input system of the embodiment.
Figure 4B:
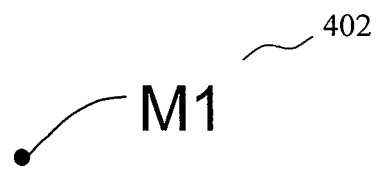
Figure 4C:
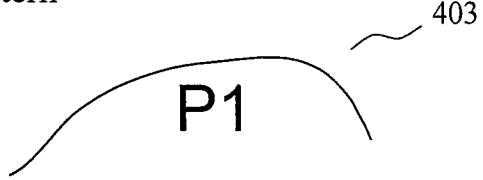
Figure 4D:
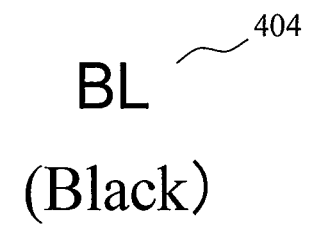
Figure 4E:
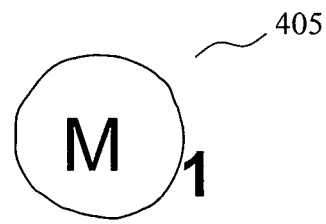
Figure 4F:
Figure 4G:
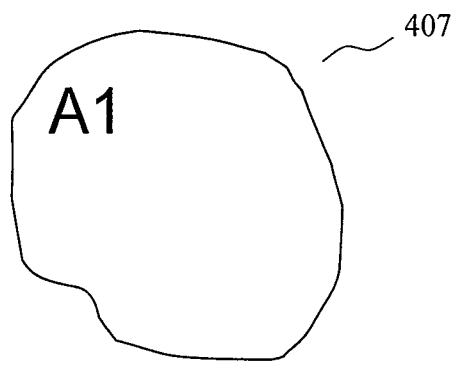
Figure 4H:
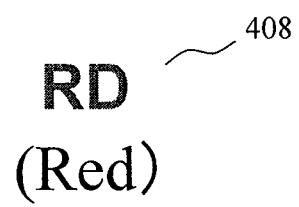

FIGS. 4A to 4H are views showing examples of symbols which can be designated by using the symbol patterns stored in the symbol pattern database 103. In FIG. 4A, a symbol 401 indicates a location with a dot, and is a symbol which is used to specify a position (location) by giving a name to the position, the name given by writing a text (M1) at a position adjacent to the dot. In FIG. 4B, a symbol 402 is an example in which a lead line is drawn from a dot and a text (M1) is written, considering the case where dots are crowded together. In FIG. 4C, a symbol 403 is an example in which a line is drawn and a name (P1) is given to the line. In FIG. 4D, a symbol 404 is an example where a text (BL) is used instead of the symbol. In FIG. 4E, a symbol 405 is such a symbol that a text (M) is written inside a circular mark and a text (1) is written near the text (M) as additional information. In FIG. 4F, a symbol 406 is an example which has no text therein. In FIG. 4G, a symbol 407 is an example where a name (A1) is given to a plane figure. In FIG. 4H, a symbol 408 is such a symbol that a text (RD) is used as a symbol and are defined by using a color (for example, red) of a pen.

As described above, the symbols are expressed in sets of arbitrary figures and texts, and are identified from each other by using spatial relationships between the figure and the figure, between the figure and the text, and between the text and the text and also by using an attribute of the pen in the pen-type input device such as the color of the pen.

FIG. 5 shows an example 501 in which the symbol pattern of the symbol 401 shown in FIG. 4A is used as an instance and is expressed in the XML format. This pattern is stored in the symbol pattern database 103 of the input host system 101. The symbol pattern collection tag can have an arbitrary number of symbol patterns. In the example shown in FIG. 5, the symbol pattern tag corresponds to the symbol 401 of FIG. 4A and includes a figure tag 501-1, a text tag 501-2, a condition tag 501-3, and a pen attribute tag 501-4. In the figure tag 501-1, a figure type is designated as "point" (dot) in a figure type tag, and it is indicated that a single dot is included in the symbol pattern. In the text tag 501-2, types of texts which can be used for the symbol and the rules of order are indicated by a text pattern tag. In this example, a regular expression is used and it is indicated that the first character is an upper-case letter (A to Z) and a numeral (0 to 9) of an arbitrary length comes next (corresponds to M1 of FIGS. 2A and 2B, for example). In the condition tag 501-3, a spatial relationship between the figure and the text is designated. In a target tag, point1 (identifier of the figure) and text1 (identifier of the text) are designated and it is designated in a relationship tag that the spatial relationship between the figure and the text is "adjacently arranged". Moreover, it is designated in the pen attribute tag 501-4 that the color of the pen of the pen-type input device is black. In other words, a symbol is determined to comply with the symbol pattern when there are a figure of a dot and a text adjacent thereto, the text pattern of the text is such that the first character is a upper-case letter and the next and the following characters are numerals, and the color of the pen of the pen-input device is black. The symbol pattern tag has a location tag 501-5. A figure or a text is designated in the location tag 501-5 as one whose location information is to be acquired, when a symbol complying with the symbol pattern is found. In this example, "point1" is designated, i.e. the location information is acquired from the location of the point.

Figure 6:
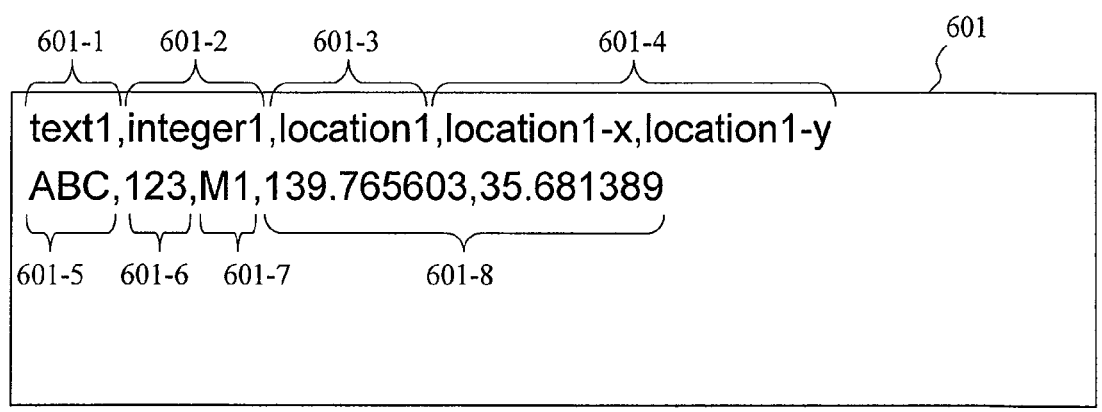
FIG. 6 is a view showing an output example of input result data in the information input system of the embodiment.

The input result data of the input result database 104 represents data on how the information written with the pen-type input device 106 is loaded as texts and values such as numeric values. An input result shown in FIG. 6 is an example of the input result data in the case where data has been written in the formats shown in FIGS. 2A and 2B. In FIG. 2A, there is the input field 202 for inputting the location information in the input format 201 and the dot and the text of "M1" are written in a portion indicated by the symbol 203. Moreover, in the input format 204 shown in FIG. 2B, ABC, 123, and M1 are written respectively in the input field 205 for a text, the input field 206 for integers, and the input field 207 for reference to the location information.

The example of the input result data shown in FIG. 6 represents the input result data with CSV (Comma Separated Values). The first line of FIG. 6 includes the identifiers of the input fields shown in the input format of FIG. 3. Specifically, the identifier of the text input field 303-1 is text1 601-1, the identifier of the integer input field 303-2 is integer1 601-2, and the identifier of the location reference input field 303-3 is location1 601-3. Moreover, the first line includes location1-*x* (X-coordinate) and location1-*y* (Y-coordinate) 601-4 as a sequence used to enter a result of: comparing the value M1 written in the location reference input field 303-3 with the symbol (M1) written in the input field 202 for inputting the location information; and then extracting the location of the symbol (M1).

In the second line and thereon, the values written with the pen-type input device 106 are arranged (601-5 to 601-7) in the order of the input fields of the first line. Moreover, in a portion corresponding to location1-*x* (X-coordinate) and location1-*y* (Y-coordinate) 601-4 (601-8), the latitude and the longitude of the corresponding symbol in unit of degrees are arranged in this example (601-8). In this example only one line is described as data. However, when there are multiple pieces of handwriting data written in the input format 204, as many data lines as the pieces of handwriting data are arranged. This enables the location information (location1-*x* and location1-*y*) 601-4 written with the pen and pieces of information (text1, integer 1) 601-1 and 601-2 associated with the location to be loaded into the information system 121 shown in FIG. 1. In other words, the data inputted into the input host system 101 can be sent to the information system 121.

An example of a processing procedure in the information system of the embodiment is described. As shown in FIG. 1, the handwriting data is loaded into the handwriting data loading part 111 of the input terminal 105 from the pen-type input device 106, and is transmitted to the input host system 101 via the network. The input field allocation part 107 of the input host system 101 acquires the handwriting data via the interface part 101*c*.

The input field allocation part 107 receives the data of input formats as shown in FIGS. 2A and 2B from the input format database 102, in a way as shown in a processing procedure (to be described later) described with reference to FIG. 7. Moreover, the input field allocation part 107 determines which portion of the handwriting data acquired from the handwriting data loading part 111 is written in which input field, and the handwriting data is divided into pieces for the respective input fields (or it also is possible to link the pieces of data with the input fields and create a table).

Next, the symbol comparison part 109 compares the symbol (for example, M1) written in the input field for the location information, such as one shown in the input format 201 of FIG. 2A, and the information (M1) in the input field 207 in the input format 204 of FIG. 2B which is used to refer to the location information, with each other. When the symbol and the information coincide with each other, the symbol comparison part 109 associates (relates) the location information (location information of the dot M1) and the information to be associated with the location, i.e. the information in the input field 205 and the input field 206 in the example of FIG. 2B, with each other.

Finally, the input result data generation part 110 forms a set of the location information (139.765603, 35.68138 of the second line of FIG. 6) and the information (ABC, 123, M1) associated with the location which are linked to each other by the symbol comparison part 109, and outputs the set to the input result database (storage unit) 104 (see the second line of FIG. 6). The input field allocation part 107, the text/geometric-figure recognition part 108, and the symbol comparison part 109 form a location information acquisition unit.

A description is given below of details of the flow of the processing.

Figure 7:
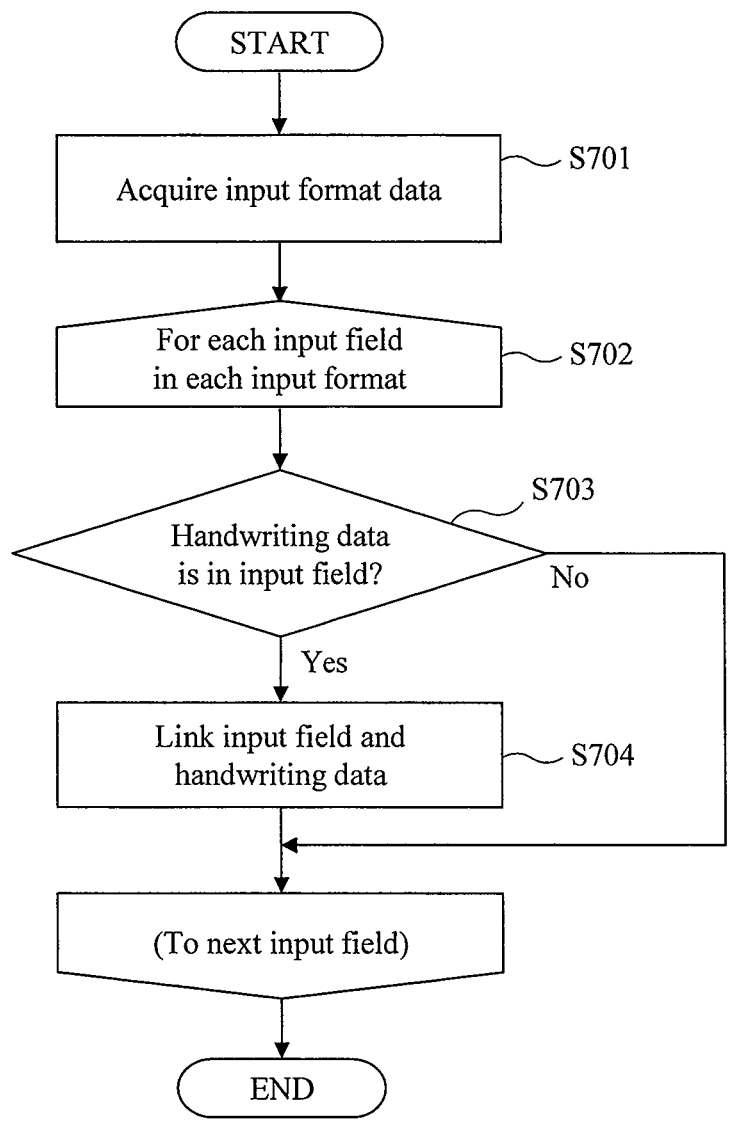
FIG. 7 is a flowchart showing a flow of processing of an input field allocation unit in the information input system of the embodiment.

FIG. 7 is a flowchart showing the flow of the processing in the input field allocation part 107. The input field allocation part 107 acquires information on the input fields designated in, for example, the input format data 301 (step S701), from the input format database 102. The input field allocation part 107 executes the following steps S703 and S704 for each of the input formats and for each of the input fields in the input formats in the input format database 102 (step S702). Specifically, the input field allocation part 107 uses the information on the range of each of target input fields, which is, in the instance of the input format data of FIG. 3, the coordinate values of the rectangular range indicated in the upper left position tag and the size tag. to judge whether the handwriting data {(x1, y1), (x2, y2), (x3, y3), . . . , (xn, yn)} loaded into the input device in FIGS. 2A and 2B is located within the range of the rectangle (any of 202, 205 to 207, and the like) (step S703).

Note that, when the coordinate system of the handwriting data is different from the coordinate system of the input fields, the judgment is performed after the coordinate systems are matched to each other.

When the handwriting data {(x1, y1), (x2, y2), (x3, y3), . . . , (xn, yn)} is within the range of the input field, the input field (any of 202 and 205 to 207 in FIGS. 2A and 2B) and the handwriting data (any of the dot, M1, and the like in FIG. 2A, ABC, 123, M1, and the like in FIG. 2B, and the position coordinates thereof) are linked to each other (step S704: FIG. 2). Incidentally, in the judgment of step S703, an allowable condition may be set in advance such as an allowable level of a text being written partially beyond the input field, in consideration of the case where the operator writes the text partially beyond the input field.

By performing the processing described above, processing of relating the allocation of the input fields as shown in FIGS. 2A and 2B (input fields 202 and 205 to 207) to the divided pieces of handwriting data and the position coordinates thereof is performed, the divided pieces of handwriting data written in the input fields, and being pieces of data on which one of the input fields is each piece of handwriting data linked to.

As described above, the text/geometric-figure recognition part 108 passes each of the pieces of data linked in the processing of FIG. 7 to, for example, an external recognition engine. The text/geometric-figure recognition part 108 acquires (specifically, from each of pieces the handwriting data which are divided respectively for the input fields by the input field allocation part 107) character code data when the piece of data is a text, and acquires data on the type of a figure and coordinate values thereof when the piece of data is a geometric figure. This processing can be performed by using a publicly-known method.

Figure 8:
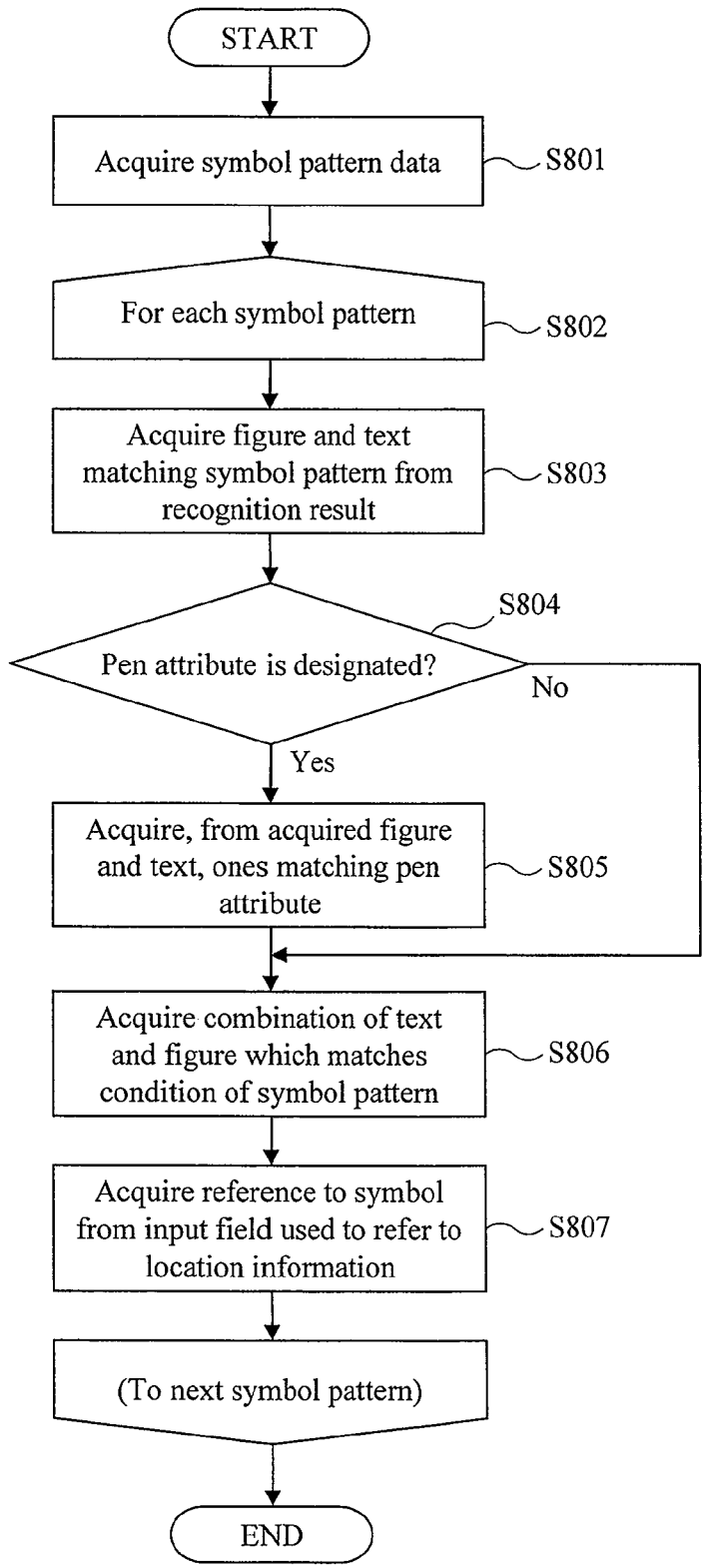
FIG. 8 is a flowchart showing a flow of processing of symbol comparison unit in the information input system of the embodiment.

FIG. 8 is a flowchart showing the flow of symbol comparison processing performed by the symbol comparison part 109. First, the symbol comparison part 109 acquires the symbol pattern data 501 as shown in FIG. 5 from the symbol pattern database 103 (step S801). The symbol comparison part 109 executes the following steps S803 to S807 to perform linking related to the input fields 202 and the 205 to 207 for each of the symbol patterns in the symbol pattern data 501 (step S802). The figure and the text in the input fields 202 and 205 to 207 to write the position data are passed to the publicly-known recognition engine. Then, figures matching the figure type designated in a target symbol pattern and texts (or a figure types) matching the text pattern designated in the target symbol pattern are acquired from the recognition result obtained as a result of the recognition processing by the recognition engine, the target symbol pattern being the piece of handwriting data currently being compared (step S803). For example, the figure of the dot and the text M1 are acquired in FIG. 2A.

Next, the symbol comparison part 109 judges whether the pen attribute 501-4 is designated in the target symbol pattern (step S804). If the pen attribute 501-4 is designated, the symbol comparison part 109 acquires, from the figures and the texts acquired in step S803, only the ones which have the pen attribute specified in the symbol pattern (step S805). Then, the symbol comparison part 109 acquires the figure and the text matching conditions specified in the symbol pattern as shown in FIG. 5. In these conditions, as many functions as the types of conditions is prepared. Whether the conditions are satisfied is judged by passing, to the functions, information (type, coordinate values, character codes) on the figure and the text being targets. For example, if two of the figures and the texts are judged to be adjacent to each other from the coordinate values thereof, a function "adjacently arranged" returns a logical value for truth, and if not, returns a logical value for false (step S806). The symbol comparison part 109 acquires, by using the symbol matching the pattern, inputs of all the location reference input fields which refer to the symbol, and links the inputs. For example, in the case of FIG. 2A, the figure of the dot and the text M1 are linked as the inputs "adjacently arranged".

There are two association methods, and a method used when a symbol is inputted in the location reference input field and a method used when only text information among the symbols is inputted are different from each other. Specifically, a judgment method used when a symbol is inputted in the location reference input field is as follows. The symbol judgment processing (steps S802 to S806) performed for the input field to write the location data is performed for the location reference input field and thereby judges whether the symbol data matches the pattern. Meanwhile, when only the text information is inputted in the location reference input field, a known character code sequence is extracted from information on the symbol acquired in step S806, and the character code sequence is compared with the text written in the location reference input field (step S807).

Thus, the location information (for example, the location information of the second line of FIG. 6) of the symbol and the information (M1 used to refer to the symbol) associated with the symbol can be linked to each other and then acquired.

Figure 9:
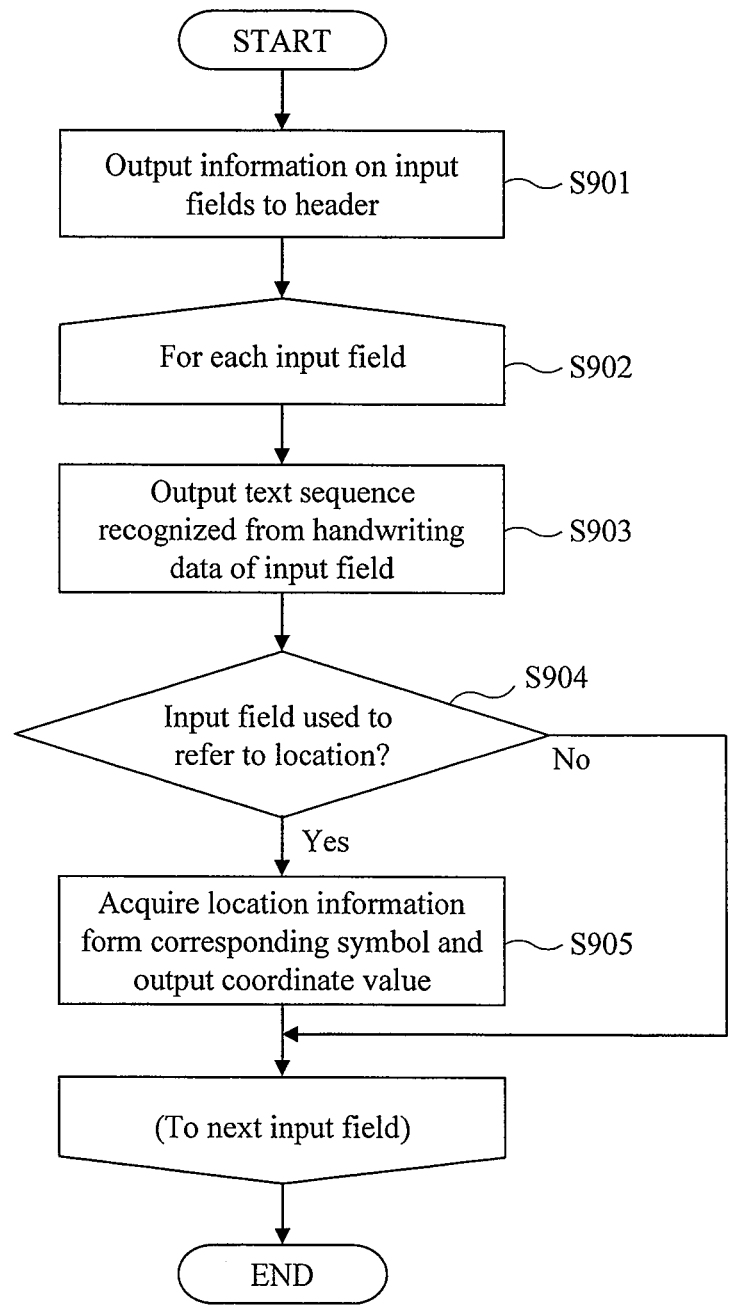
FIG. 9 is a flowchart showing a flow of processing in an input result data generation unit in the information input system of the embodiment.

FIG. 9 shows a processing procedure of the input result data generation part 110. The input result data generation part 110 outputs the information on the input fields to a header portion of the input result database 104 (step S901). The header portion corresponds to the description of the first line of the input result data of FIG. 6. The header portion may be omitted if a system to receive the input result data from the input result database 104 already knows the data structure of the input result data. The input result data generation part 110 executes the following steps S903 to S905 for each of the input fields (step S902). The input result data generation part 110 outputs the data recognized by the text/geometric-figure recognition part 108 in the handwriting data corresponding to the input field, to the input result database as a text sequence (step S903: for example, ABC, 123, and M1 of FIG. 6). Then, the input result data generation part 110 judges whether the input field (205, 206, or 207) is the input field used to refer to the location information (whether it is the location reference of FIG. 3) (step S904). If the input field is the location reference input field (YES: 207), the input result data generation part 110 acquires the location information (coordinate value information: 139.765603, 35.68138) of the symbol M1 linked by the symbol comparison part 109 and outputs the location information to the input result database 104 (step S905). When it is judged in step S904 that the input field is not the input field used to refer to the location (NO), the input result data generation part 110 proceeds to processing for the next input field. The location herein is a location on the paper sheet of FIG. 2A and is not an absolute coordinate. However, the location can be obtained as a coordinate of an absolute location, for example, by using the data on latitude and longitude of FIG. 3. Moreover, in a case of using a drawing or a graph instead of the map, there is no need to use the information on latitude and longitude.

The input result data as shown in FIG. 6 (second line) can be generated as described above. The input result data can be send to the information system 121 from the input result database 104 of FIG. 1 and used for edit processing and output processing such as displaying and printing. For example, when the information system 121 has a GIS (Geographic Information System), latitude/longitude information of the location inputted on the map with the pen-type input device 106 can be displayed on a display unit of the information system 121 in such a way that the location is pointed. The location reference of an arbitrary point on the map can be made by giving an instruction on the map with pen-type input device 106.

Moreover, the input device is assumed to be a digital pen, a stylus, an electronic blackboard, a remote cooperative work supporting apparatus, or a remote presentation apparatus.

As described above, the input system for inputting location information and the information to be associated with the location of the embodiment has the following effects.

(1) An operation procedure of inputting the location information and an operation procedure of inputting the information to be associated with the location can be performed by performing operations such as drawing a dot in a map or the like and inputting information related to the dot in the location input field. Thus, the operations are similar to the conventional operations performed in the case of using a paper sheet and a pen. Accordingly, the operations are standardized by using methods easily learnable by the operator and thus a system which is easy to use for the operator is achieved.

(2) The information of handwriting written with the pen-type input device can be stored in a form easily recognizable by the operator in a review. Thus, the information can be passed to and shared with other devices to be checked and corrected, even in a state before the information loaded into the system. (3) Not only the information on numeric values and texts as in the conventional systems but also the location information and the relationship thereof with the location information can be left as a trail.

The embodiment described above is not limited to the configuration and the like illustrated in the attached drawing, and can be appropriately modified within a scope in which the effects of the present invention are exhibited. Moreover, the configuration and the like can be appropriately modified and carried out within a scope of the object of the present invention.

INDUSTRIAL APPLICABILITY

The present invention can be used for an information input system.

EXPLANATION OF REFERENCE NUMERALS

101 . . . input host system, 102 . . . input format database (input format presenting unit), 103 . . . symbol pattern database, 104 . . . input result database, 105 . . . input terminal, 106 . . . pen-type input device, 107 . . . input field allocation part, 108 . . . text/geometric-figure recognition part, 109 . . . symbol comparison part, 110 . . . input result data generation part, 201 . . . example of input format for inputting location information, 202 . . . example of input field used to input location information, 203 example of input of location information using symbol, 204 . . . example of input format for inputting information to be associated with location, 205 . . . example of text information input field, 206 . . . example of numeric value input field, 207 . . . example of field used to input reference to location information, 401 to 408 . . . examples of symbols which can be expressed in symbol pattern data.

What is claimed is:

1. An information input apparatus for inputting location information using a pen-type input device configured to acquire handwriting data expressed as a trace of coordinate positions, the information input apparatus comprising:
a processor and a memory, the processor being programmed with instructions stored in the memory to:
present an input format including a first input format and a second input format to receive the handwriting data, the first input format having a location input field and a location association information input field, the location input field receives a name or a symbol including at least a point at a relative location in a drawing, from which absolute location information of the name or the symbol is referable, to designate a location of the name or the symbol and to input the location of the name or the symbol in a manner associated with a first symbol for specifying the location, the location association information input field receives location association information which is desired to be associated with the location of the name or the symbol and includes a second symbol used to refer to the location of the name or the symbol, and the second input format to receive information associated with the relative location and the name or symbol specifying the relative location;
perform text/geometric-figure recognition of the name or the symbol from the handwriting data, specifying the location of the name or the symbol inputted in the location input field in a manner associated with the first symbol, and thereby obtain a relative location information of the name or the symbol on a medium having another location input field corresponding to the location input field;
compare the name or symbol input in the first input format and the information input in the second input format and acquire the relative location information of the name or symbol and the information associated with the name or symbol to compare the relative location information and the information associated with the name or symbol, and convert the relative location information into absolute location information; and
output and store in a computer-readable storage a set of the absolute location information and the information associated with the name or the symbol as represented in the handwriting data received in the first input format and the second input format, which have been determined by the comparing to be associated with each other when it is judged that the first symbol and the second symbol are the same on the basis of the comparing a set of the absolute location information and information associated with the symbol, which have been associated with each other in the comparing unit.

2. The information input apparatus according to claim 1, wherein the processor is further programmed to:
link the handwriting data located within the location input field with the location input field by using location information of the location input field and thereby obtain the location of the name or the symbol.

3. The information input apparatus according to claim 1, wherein the processor is further programmed to:
present an input format having a location association information input field used to input location association information which is desired to be associated with the location of the name or the symbol used to refer to the location of the name or the symbol, and
generate input result data including the location of the name or the symbol and the location association information.

4. The information input apparatus according to claim 1, wherein the processor is further programmed to:
link the handwriting data located within the location input field with the input field by using location information of the location input field and thereby obtain the location of the name or the symbol.

5. The information input apparatus according to claim 1, wherein the processor is further programmed to:
acquire the handwriting data from the pen-type input device; and
output the set of the absolute location information and the information associated with the name or symbol to an information system.

6. An information input method with which location information and information to be associated with a location are acquired from a pen-type input device configured to acquire handwriting data expressed as a trace of coordinate positions, the information input method performed by a processor performing the steps of:
presenting an input format including a first input format and a second input format to receive the handwriting data, the first input format having a location input field and a location association information input field, the location input field receives a name or a symbol including at least a point at a relative location in a drawing, from which absolute location information of the name or the symbol is referable, to designate a location of the name or the symbol and to input the location of the name or the symbol in a manner associated with a first symbol for specifying the location, the location association information input field receives location association information which is desired to be associated with the location of the name or the symbol and includes a second symbol used to refer to the location of the name or the symbol, and the second input format to receive input location association information which is to be associated with the location of the name or the symbol;

performing text/geometric-figure recognition of the name or the symbol from the handwriting data, specifying the location of the name or the symbol inputted in the location input field in a manner associated with the first symbol, and thereby obtaining a relative location information of the name or the symbol on a medium having another location input field corresponding to the location input field;

comparing the name or symbol input in the first input format and the information input in the second input format and acquiring the relative location information of the name or symbol and information associated with the name or symbol to compare the relative location information and the information associated with the name or symbol, and converting the relative location information into absolute location information; and outputting and storing in a computer-readable storage a set of the absolute location information and the information associated with the name or symbol as represented in the handwriting data received in the first input format and the second input format, which have been associated with each other in the comparing when it is judged that the first symbol and the second symbol are the same on the basis of the comparing a set of the absolute location information and information associated with the symbol, which have been associated with each other in the comparing unit.

7. A non-transitory computer-readable recording medium storing a program for causing a processor to execute an information input method with which location information and information to be associated with a location are acquired from a pen-type input device configured to acquire handwriting data expressed as a trace of coordinate positions, where the processor is caused to perform the steps of:

presenting an input format including a first input format and a second input format to receive the handwriting data, the first input format having a location input field and a location association information input field, the location input field receives a name or a symbol including at least a point at a relative location in a drawing, from which absolute location information of the name or the symbol is referable, to designate a location of the name or the symbol and to input the location of the name or the symbol in a manner associated with a first symbol for specifying the location, the location association information input field receives location association information which is desired to be associated with the location of the name or the symbol and includes a second symbol used to refer to the location of the name or the symbol, and the second input format to receive input location association information which is to be associated with the location of the name or the symbol;

performing text/geometric-figure recognition of the name or the symbol from the handwriting data, specifying the location of the name or the symbol inputted in the location input field in a manner associated with the first symbol, and thereby obtaining a relative location information of the name or the symbol on a medium having another location input field corresponding to the location input field;

comparing the name or symbol input in the first input format and the information input in the second input format and acquiring the relative location information of the name or symbol and information associated with the name or symbol to compare the relative location information and the information associated with the name or symbol, and converting the relative location information into absolute location information; and outputting and storing in a computer-readable storage a set of the absolute location information and the information associated with the name or symbol as represented in the handwriting data received in the first input format and the second input format, which have been associated with each other in the comparing when it is judged that the first symbol and the second symbol are the same on the basis of the comparing a set of the absolute location information and information associated with the symbol, which have been associated with each other in the comparing unit.

* * * * *